United States Patent [19]

Bergler

[11] Patent Number: 4,585,077
[45] Date of Patent: Apr. 29, 1986

[54] DRILLING MECHANISM OPTIONALLY USABLE AS A ROTARY DRILL OR A HAMMER DRILL

[75] Inventor: Otto Bergler, Muhlacker-Lomersheim, Fed. Rep. of Germany

[73] Assignee: Black & Decker Overseas AG, Vaduz, Liechtenstein

[21] Appl. No.: 548,764

[22] Filed: Nov. 4, 1983

[30] Foreign Application Priority Data

Nov. 10, 1982 [DE] Fed. Rep. of Germany ....... 3241528

[51] Int. Cl.$^4$ .............................................. E02D 7/02
[52] U.S. Cl. ........................................ 173/48; 173/13; 279/19
[58] Field of Search ............... 173/47, 48, 18, 29, 173/13; 279/1 K, 122, 123, 75, 19-19.4

[56] References Cited

U.S. PATENT DOCUMENTS

| 3,000,225 | 9/1961 | Taylor | 173/48 |
|---|---|---|---|
| 3,044,790 | 7/1962 | Stoner | 279/1 K |
| 3,145,782 | 8/1964 | Bruin | 173/48 |
| 3,430,707 | 3/1969 | Rees | 173/48 |
| 3,507,337 | 4/1970 | Chromy | 173/48 |
| 3,730,281 | 5/1973 | Wood | 173/48 |
| 4,131,165 | 12/1978 | Wanner et al. | 173/48 |
| 4,236,588 | 12/1980 | Moldan et al. | 173/48 |
| 4,434,859 | 3/1984 | Rumpp et al. | 173/48 |

FOREIGN PATENT DOCUMENTS

| 048482 | 3/1983 | European Pat. Off. |
| 1155657 | 10/1963 | Fed. Rep. of Germany |
| 2551125 | 5/1977 | Fed. Rep. of Germany |
| 3132450 | 2/1983 | Fed. Rep. of Germany |
| 2454864 | 11/1980 | France |
| 627117 | 12/1981 | Switzerland |
| 2058645 | 4/1981 | United Kingdom |
| 2114496 | 8/1983 | United Kingdom |

OTHER PUBLICATIONS

Brochure article, 2 pgs. "HILTI" printed in Liechtenstein, 1981.

Primary Examiner—Donald R. Schran
Assistant Examiner—James L. Wolfe
Attorney, Agent, or Firm—Burns, Doane, Swecker & Mathis

[57] ABSTRACT

A manual drilling mechanism can optionally be employed for (i) rotary drilling wherein the rotating motion of a drive spindle may be transmitted to a rotary drilling tool, or (ii) hammer drilling wherein an impact bolt guided in the drive spindle is impacted against the end of a hammer drilling tool. The latter tool is axially movably guided in a hammer drill holder. A drill chuck is attached to the spindle. The chuck carries jaws for clamping the rotary drill tool. The jaws are movable between tool-clamping and tool-release positions. The chuck has a passage for the impact bolt. The passage has a diameter slightly smaller than the space between the jaws when the latter are in the tool-clamping position. The chuck forms a receiving sleeve for the drill hammer holder.

25 Claims, 11 Drawing Figures

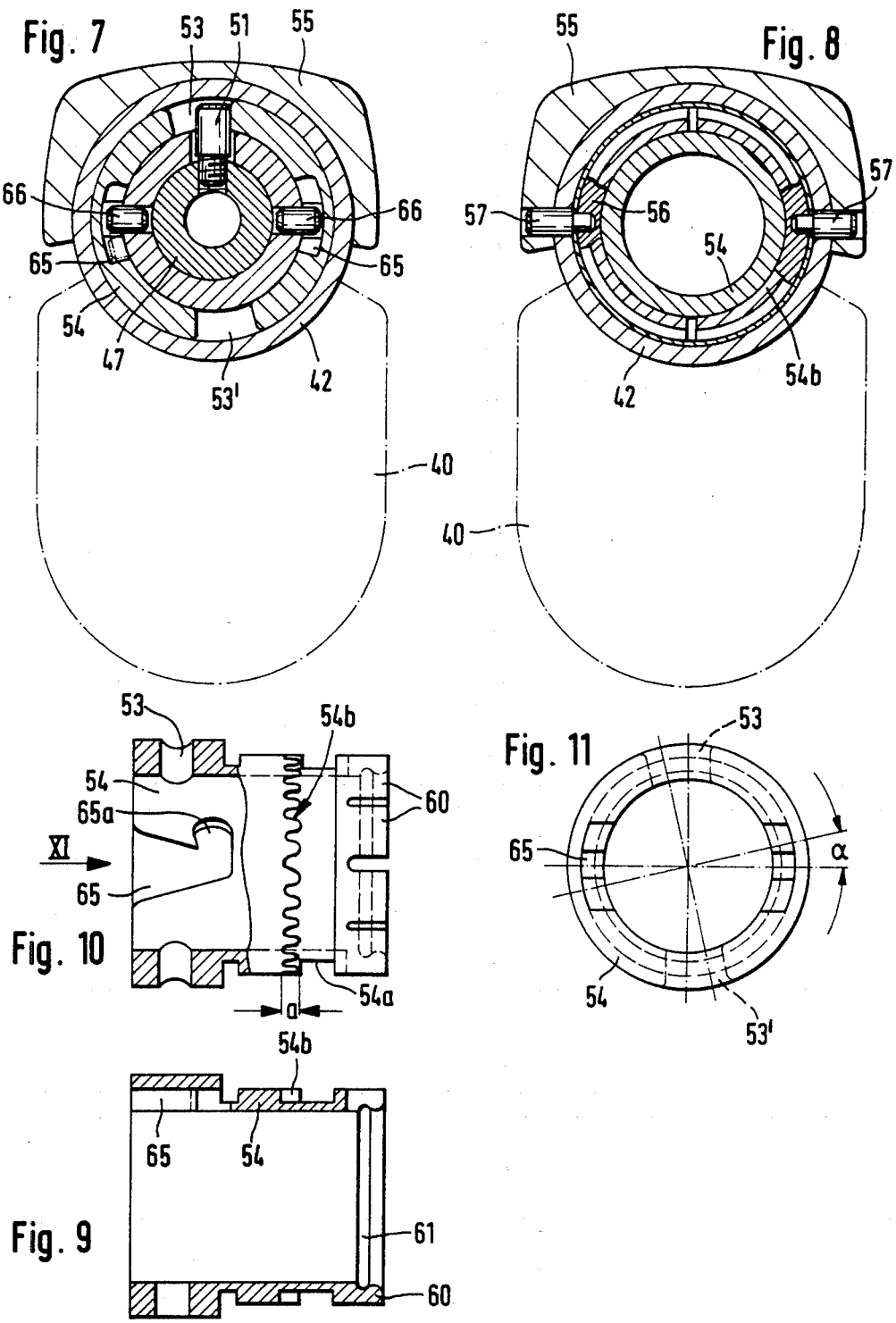

DRILLING MECHANISM OPTIONALLY USABLE AS A ROTARY DRILL OR A HAMMER DRILL

BACKGROUND AND OBJECTS OF THE INVENTION

The invention concerns a drilling machine, in particular, a manual drill, whereby optionally (i) the rotating motion of a hollow drive spindle may be transmitted to a drilling tool, or (2) an impact effect may be obtained on the end of an axially movable drilling tool in an impact drill holder by means of an impact bolt guided through the drive spindle.

Manual drills of this type are known (Hilti Operating Instructions for Hammer Drill TE 12, 1981). In the known configurations, in which the rotating drive is effected by means of an electric motor, and the impact bolt is driven pneumatically by a piston reciprocated by an electric drive, special hammer drill tools must be provided for the impact drilling mode of operation; they are designed for positive entrainment. Thus, it is known either to provide longitudinal grooves on the shaft of the tool shaft to engage a plurality of balls provided on the drill spindle, or to design the shaft in a hexagonal form or the like, thereby making it possible to prevent rotation by inserting the tool into a corresponding positive guide, while maintaining axial mobility. Even though these known configurations have a switching position in which essentially only the rotating motion is transmitted, it is a disadvantage in the case of the hammer-type tools that they remain mobile in the axial direction. A further disadvantage is that conventional drilling tools, such as those used in pure drilling machines, may be used only with the insertion of an additional drill chuck, which in turn, has a fastening shaft designed to correspond to the shaft of the impact drilling tools and therefore again cannot be secured satisfactorily in rotation and in the axial direction.

There are further manual drills in which the rotating drive for the drill chuck is combined with a ratchet-like intermediate piece (as described in DE-AS 1 155 657), which also provides a certain impact motion, which, however, is not comparable to the intensive, actual impact motion obtained with the afore-mentioned hammer drills. Machines of the last mentioned type may be used (especially for household purposes) for purely drilling work and to a certain extent for work similar to impact drilling, but are not suitable for work requiring an intensive impact action, for example, drilling in concrete or rock.

It is the object of the present invention to design a drilling machine, in particular, a manual drill of the above-mentioned type, so that it is suitable both for use with drilling tools having a smooth shaft and as a hammer drill, without the need for the installation and removal of a drill chuck.

SUMMARY OF PREFERRED EMBODIMENTS OF THE INVENTION

The invention concerns a drilling machine in which the drill chuck has a central passage orifice for the impact bolt with a diameter that is slightly smaller than the width between the fully opened clamping jaws. The drill chuck is mounted at the end of the drive spindle and forms the retaining sleeve for the hammer drill holder. This configuration has the advantage that the drill chuck is fastened rigidly to the rotating drive, so that drilling tools held by the clamping jaws are guided satisfactorily both in the circumferential direction and axially. Since the drill chuck is open toward the rear, an impact bolt may be provided, in contrast to the known configurations (i.e., as in the case of hammer drills), so that when the clamping jaws are opened and the hammer drill holder has become effective, use as a hammer drill is possible. The hammer drill holder may be configured in a number of ways and may be based on known systems of hammer drill holding fixtures. It is particularly advantageous when the hammer drill holder comprises at least two radially mobile balls held by a sleeve mounted in an axially mobile manner in the drill chuck, that the balls rest against an oblique stop face of the sleeve which is under spring pressure, and engage the axial grooves of an impact drilling tool. The sleeve may be surrounded by a rotatable outer cap of the drill chuck engaging with clearance, by means of thread-like internal projections, corresponding outward facing projections on the circumference of the sleeve, thereby securing said sleeve in two adjustable terminal positions for use as a drill or a hammer drill. In this configuration, the rotating range of the outer cap may be determined with the aid of latching means and limited by terminal stops, as in this case, the clamping surfaces of the jaws also serving as the guiding surfaces for the hammer drill tool in its back and forth movement.

To prevent an interference of the balls needed to hold the hammer drill tool in a purely drilling operation with the functioning of the clamping jaws, they may be resting in the drilling position of their holding sleeve against the side facing away from the drilling tool and held in a radial position wherein they are not protruding into the space between the clamping jaws. With the clamping jaws opened and in the impact drilling position, on the other hand, the balls are released radially by the end of the opened clamping jaws and are able to perform their fastening function. At the outermost end of the clamping jaws and on the core of the drill chuck, holding projections may be provided to prevent the complete dropping out of the balls from the holder.

A further preferred embodiment of the invention involves providing the outer cap with recesses on its circumference which, in the terminal position (wherein the holding sleeve occupies the drilling position and releases the balls radially), are aligned with known orifices for the insertion of the adjusting key for the clamping jaws. In the other terminal position for hammer drilling, the recesses are rotated to cover the key-receiving orifices. This configuration, wherein the rotating range of the outer cap needs to be only approximately 60 degrees, has the advantage that an adjustment of the clamping jaws in the hammer drilling position is not possible. In order to additionally insure that the hammer drill in the drilling strikes the end of the drill clamped-in, a radially inwardly protruding cam may be provided for the outer cap, which in the drilling position pressures a safety device supported in the drill chuck radially against the force of a spring into the area between the clamping jaws located at a short distance in front of the impact bolt protruding into the drill chuck. Even if the drilling tool is clamped in the clamping jaws in an excessively inward position, it cannot be inserted farther than the safety pin, so that contact of the impact bolt with the front end of the drill is prevented.

In the above-described embodiment, in which the clamping surfaces of the jaws also cooperate in the guidance of the hammer drill tool, the diameter of the drilling tools to be clamped-in is limited by this terminal position. As the hammer drills generally have relatively thin clamping shafts, in this configuration the clamping of thicker, purely drilling tools would not be possible.

Advantageously it may be provided in another configuration, therefore, to insert into the passage orifice of the drill chuck an indexing sleeve connected fixedly in rotation with the drive spindle and displaceable axially. The indexing sleeve is securable in each of the terminal positions corresponding to drilling or hammer drilling, and is equipped at its end projecting into the drill chuck with means for the connection fixed in rotation with a hammer drill and the axial guidance thereof. This configuration thus has the advantage that the indexing sleeve may be adapted in its internal diameter to the shaft of a hammer drill, but wherein the diameter of the drilling tools to be mounted may extend to the external diameter of said indexing sleeve. Thus, depending on the choice of a wall thickness for the indexing sleeve, an appreciable increase in the clamping diameter of drills is obtained. This embodiment further has the advantage that the adjusting mechanism for the means to mount hammer drills need not necessarily be located on the drill chuck itself. As the indexing sleeve may be displaced axially back and forth, it may also be used to control the actuation and disengagement of the fastening means for hammer drilling; this will be described in detail hereinbelow.

The advantage of this form of embodiment involves the fact that the length of the chuck drill corresponds to that of a conventional drill chuck, whereby a highly compact and thus readily manipulated manual drilling machine is obtained.

In an advantageous embodiment, the drill chuck may be screwed from the outside onto the hollow drive spindle, while the indexing sleeve is guided inside the drive spindle and, in turn, serves to guide the impact bolt. The indexing sleeve is provided with an axial stroke length that in the terminal position corresponding to drilling, it is located with its front end behind the area of the clamping guide of the jaws, while in the terminal position for hammer drilling, it extends between the radially retracted ends of the jaws and is held radially by the latter. As mentioned hereinabove, in order not to increase the size of the drill chuck itself by additional parts, the terminal positions of the indexing sleeve may be secured by means of a locking sleeve mounted outside on the drive spindle. The locking sleeve is connected axially in a rigid manner with the indexing sleeve, and is capable of being displaced from the outside into two terminal positions and locked therein. In order for the actuating means to be independent from the rotating motion performed both by the drive spindle and the indexing sleeve guided therein, the locking sleeve may be connected by means of a pin extending radially through an elongated slot in the drive spindle with the indexing sleeve, and by means of a releasable clutch with a manual handle or the like, located outside on the housing of the drilling machine. To secure the locking sleeve in its terminal position, the pin may be arranged in the locking sleeve movably in an elongated hole, the length of which corresponds at least to that of the bayonet lock like recesses on the inside of the locking sleeve. The recesses cooperate with a plurality of locking projections rigidly mounted on the drive spindle, to secure the terminal position for hammer drilling of the indexing sleeve.

To secure the other terminal position, i.e., the "drilling" position, the locking sleeve may be quipped on its end facing away from the bayonet lock like recesses, with spring elastic locking arms which lockingly engage the drive spindle by means of a bead. From these two terminal positions the locking sleeve may be displaced by the use of the actuating handle from the outside, this being by means of the afore-mentioned clutch. The clutch conveniently comprises a driver ring mounted rotatingly and axially displaceable on the locking sleeve. The drive ring is rigidly connected with the handle and is applicable to stops in the locking sleeve. The stop of the locking sleeve facing the bayonet like recesses is provided with axial projections preferably in the form of a stop collar equipped with teeth, and the driver ring with corresponding teeth, cooperating positively with the teeth of the locking sleeve, thereby making possible a rotation of the locking sleeve sufficient for bayonet locking in the terminal position for "hammer drilling".

In order to insure that the driver ring, which may be pressured against the force of a spring in the direction of the teeth of the stop collar, is released from the teeth after the locking of the locking sleeve, the driver ring may be connected by means of two diametrically opposite pins with the manual handle surrounding the housing on the outside by at least 180 degrees. The pins are guided in elongated slots in the housing. The elongated slots having a widening at least at their end facing the drill chuck, which widening corresponding to the rotating path is necessary for the bayonet locking. The widening of the elongated slot must further have an axial dimension corresponding at least to the diameter of the pins connecting the driver ring with the handle, plus the height of the teeth on the stop collar. In such a configuration, the teeth of the drive ring are released automatically from the immobilized locking sleeve, so that all of the parts within the housing may be placed into rotation.

The means arranged at the end of the indexing sleeve for the connection fixed in rotation and the axial guidance of a hammer drilling too may again be based on known means. Advantageously, these means may consist of balls, radially mobile in the recesses of the indexing sleeve and in the "drilling" position of the indexing sleeve pressured by the impact bolt located in the indexing sleeve into longitudinal grooves of the drive spindle and thus taken out of operation.

In the "hammer drilling" position, the balls extend into the inside of the indexing sleeve and the corresponding recesses of the hammer drill and are held in this position by parts of the drill chuck adjacent on the outside to the indexing sleeve, preferably, the clamping surfaces of the jaws. In this configuration, the longitudinal grooves in the drive spindle may be open toward the drill chuck and the arrangement may be such that in front of each longitudinal groove inside of the jaws extending obliquely to the axis of the drive spindle are provided, so that the jaws seizing the balls emerging from the longitudinal grooves of the drive spindle upon the advance of the indexing sleeve into the "hammer drilling" position and guide them into engagement in the longitudinal grooves of the hammer drill tools.

The embodiment of the drilling machine with an indexing sleeve has the advantage that the indexing sleeve may perform the function of an ejector for the hammer drills. That is, the sleeve is retracted in the "drilling" position relative to the impact bolt, which can then apply pressure to the end of the hammer drill to eject the latter.

THE DRAWING

Further advantages and characteristics of the invention will become apparent from the foregoing description of the embodiments, illustrated in the drawing:

FIG. 7 is a sectional view taken through the form of embodiment of FIG. 5 along the line VII—VII;

FIG. 8 is a sectional view taken through the form of embodiments of FIG. 6 along the line VIII—VIII;

FIG. 9 depicts a detail of the locking sleeve provided in the embodiment of FIGS. 5 and 6 for the terminal positioning of the indexing sleeve in a longitudinal section;

FIG. 10 depicts a lateral elevation of the locking sleeve of FIG. 9; and

FIG. 11 depicts a front elevation of the locking sleeve of FIG. 10 viewed in the direction of the arrow 11.

DETAILED DESCRIPTION OF PREFERRED EMBODIMENTS OF THE INVENTION

Figure 1:
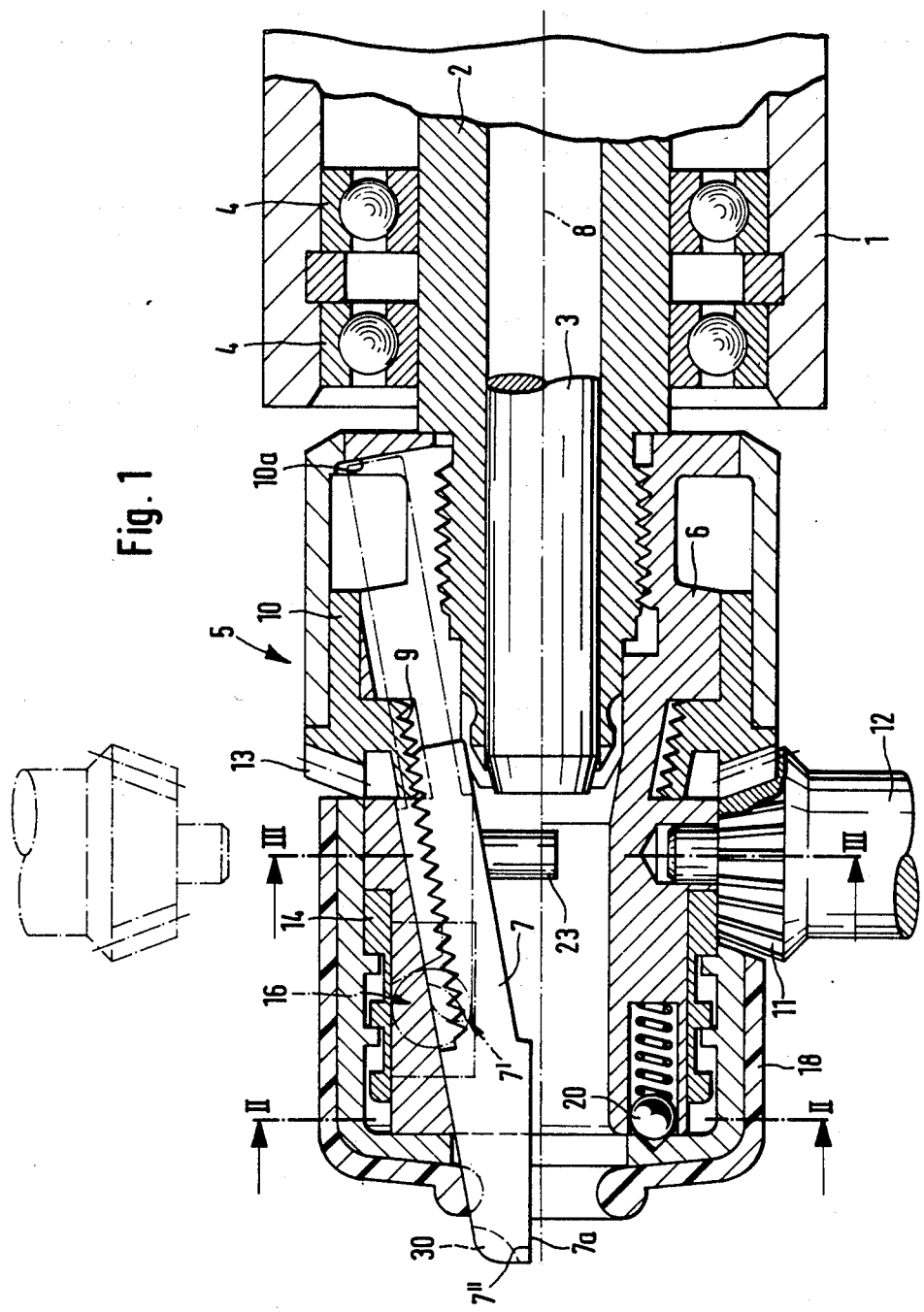
FIG. 1 is a schematic longitudinal sectional view taken through the drilling head of a hammer drill machine with a drill chuck rigidly mounted on the rotating drive and a holder for hammer drills integrated into the drill chuck.
Figure 4:
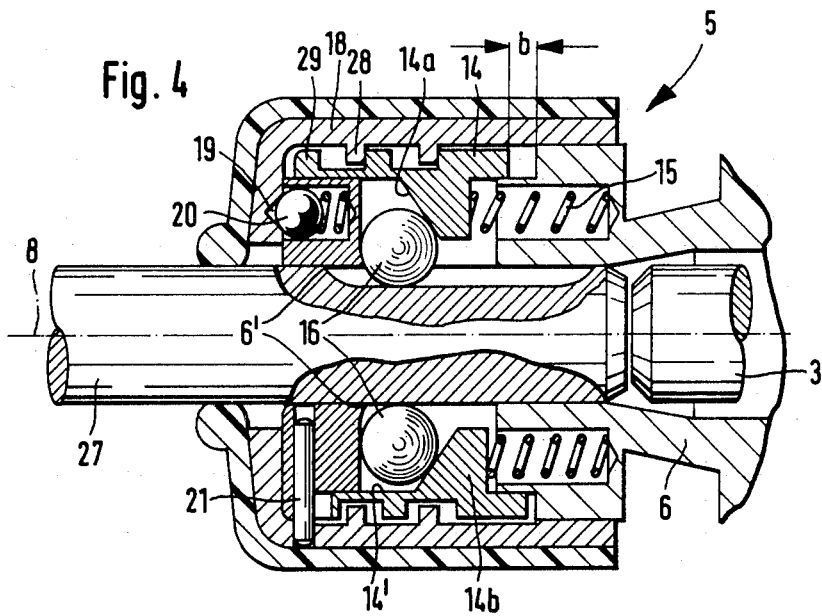
FIG. 4 is a partial view of the front end of the drill chuck of the embodiment of FIG. 1, the upper half depicting the condition with the hammer drill mounted, and the lower half depicting the condition during the insertion of a hammer drill; in both cases, for the sake of clarity, the jaws are omitted, the jaws having been retracted.

FIG. 1 depicts the front end of a housing 1 of a manual drilling machine, from which a drive spindle 2 connected with a rotating drive in a manner not shown in detail, is protruding. The drive spindle 2 is hollow and serves to guide an impact bolt 3 which receives axial impacts from an impact piston and is capable of passing them onto hammer drilling tool 27 (FIG. 4), for example, a hammer drill. Neither the rotating drive (effected by means of an electric motor for the drive spindle 2, supported on ball bearings 4 in the housing 1), nor the impact drive for the impact bolt 3 are shown, because these drives may be provided in the known manner and are part of the state of the art cited hereinabove.

A drill chuck 5 which is screwed onto the end of the drive spindle 2, comprises a drill chuck core 6 in which clamping jaws 7 are bearingly supported in a known manner obliquely to the axis 8 of the drive spindle 2. The jaws engage, by means of an adjusting gear, a threading 9 of a rotating ring 10. The ring 10 engages, in a known manner, a key 12, which has a conical gear 11 meshing with a corresponding threading 13 of the rotating ring 10. By rotating the shaft, the jaws 7 are adjusted.

In the position shown in FIG. 1, the clamping jaws 7 are displaced with their clamping surfaces 7a into their radially innermost position. The position that is radially the widest is indicated by a dash-and-dot line, wherein the rear ends of the jaws abut against the oblique wall 10a of the rotating ring 10. The front ends of the jaws 7 are indicated in this position by numeral 7'. In an area of the drill chuck core 6 at which the outer sides of the clamping jaws 7 are guided on a wedge surface (as seen in particular, in FIGS. 2 to 4), a sleeve 14 is supported in an axially displaceable manner. The sleeve 14 surrounds the drill chuck core 6 annularly and has two projections 14b (FIG. 4) with beveled surfaces 14a which project into recesses of the drill chuck core 6. Two balls 16 are held in diametrically opposing positions. The balls 16 are held out-of-the-way in the "rotary drilling" position (FIG. 1) (in which the jaws 7 are disposed in the radially inward position) by corresponding guide grooves 17 on the rear side of the jaws and pressured against the cylindrical inner wall 14' of the sleeve 14, as seen in particular in FIG. 2. The balls 16 thus do not interfere with the effectiveness of the clamping surfaces 7a of the jaws 7 for use in drilling.

The drill chuck core 6 and the sleeve 14 are surrounded on the outside by an outer cap 18, which may be rotated (FIG. 3) in a path S of 60 degrees with respect to the drill chuck core. The two terminal positions of the outer cap 18 are secured by recesses 19 in the front part of the outer cap 18, into which a locking ball 20 is forced under the bias of a coil spring, when the corresponding position is attained. A pin 21 serves in each case as the end stop to limit the path S. The pin 21 is guided in a corresponding slot of the drill chuck core 6. The manual drilling machine may thus be brought into the "rotary drilling" or "hammer drilling" position by rotating the outer cap. This is effected in the following manner.

Figures 2, 3:
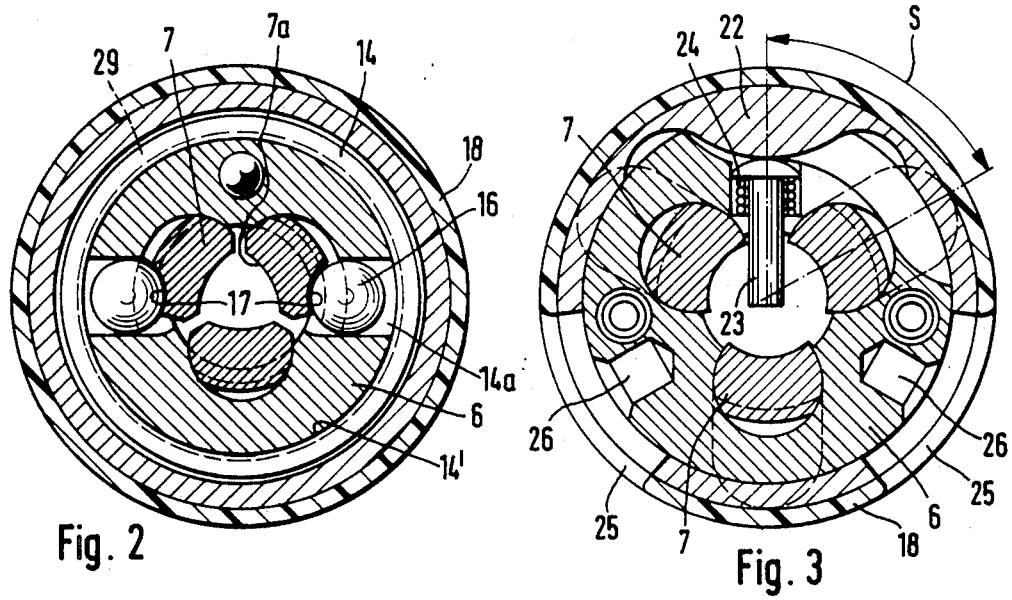
FIG. 2 is a sectional view taken through the configuration of FIG. 1 along the line II—II.
FIG. 3 is a sectional view taken through the configuration of FIG. 1 along the line III—III.

As explained already in connection with FIGS. 1 and 3, the balls 16 in the "drilling" position are in contact with the inner wall 14' of the sleeve 14 and are held there by the clamping jaws 7. In this position, a cam 22 (FIG. 3) provided on the inner side of the outer cap 18 further acts on the end of a safety pin 23, which is located in a radially displaceable manner in the drill chuck core 6. The safety pin 23 is thereby pushed against the force of a return spring 24 radially into the area between the jaws 7. The safety pin 23 is located, as seen in FIGS. 1 and 7, in an area behind the clamping surfaces 7a of the jaws 7, and in front of the impact bolt 3. The safety pin 23 prevents in this manner an unintentional insertion of the shaft of a drilling tool far enough so that the impact bolt 3 could strike the rear frontal surface of the drilling tool. In this "drilling" position, as shown in FIGS. 1 to 3, recesses 25 in the jacket of the outer cap 18 are aligned with two blind guide holes 26 of the core 6 and accommodate the insertion of the adjusting key 12. In the "drilling" position of the outer cap 18, therefore, the adjustment of the jaws 7 in keeping with the diameter of the drilling tool used, is possible.

To convert to the "hammer drilling" position, the outer cap 18 is rotated by the distance S with respect to the drill chuck core 6, which is effected by manually rotating the cap 18 while holding the manual drilling tool stationary. The cam 22 moves, during this rotating motion, away from the end of the safety pin 23, which is thus pushed radially outwardly by the force of the spring 24 and thus no longer protrudes into the opening between the clamping jaw 7. But the rotating process also has an effect on the sleeve 14 and thus on the balls 16 which now, after the jaws 7 have been brought into their fully retracted position (terminal position 7') are to be used for preventing rotation of a hammer drilling tool 27. For this purpose, projections 28 (FIG. 4) protrude inwardly from the outer cap 18 and have the configuration of helically threaded pieces. The projections cooperate with correspondingly arranged rings 29 of the sleeve 14 so that by means of the rotation of the cap 18, there can be attained either the locking of the sleeve 14 in the terminal position shown in FIG. 1 (i.e., the "drilling position"), in which the balls abut against the wall 14', or in the terminal position shown in the upper half of FIG. 4 (i.e., the "hammer drilling" position), wherein the projections 28 act as stops for the sleeve 14 as the latter is biased to the left by the force of the spring 15. The balls 16, in the "hammer drilling" position, are freely movable in the axial direction and thus permit an axial motion of the hammer drilling tool 27. However, the spring contact pressure of the wall 14a prevents any radial deflection.

In the "hammer drilling" position, the sleeve 14 is prevented from moving to the left, but not from moving axially to the right. Thus, the balls 16, initially in their radially inward pressured position, can be pressed radially outwardly by the end of the hammer drill tool 27, when the end of the tool shaft has passed the balls. To release the hammer drilling tool 27, the sleeve 14 is brought into the terminal position shown in FIG. 1 by rotating the outer cap 18, thereby compressing the spring 15. Thereafter, during the retraction of the shaft of the hammer drill tool 27, the balls 16 slide radially outwardly on the inclined surface of the grooves 27a and may, in case of another clamping of the jaws, be pushed by the rear side of the jaws completely into their FIG. 1 position in the outward direction.

In order to prevent the balls from completely dropping out from the drill chuck core 6 during the removal or prior to the insertion of the hammer drill tool 27, the drill chuck core 6 is provided with projections 6' on the side facing the balls 16. The projections 6' cooperate with the projections 7", which are created on the inner side of the jaws 7 by the recesses 30 provided on the front side (FIG. 1). The two noses 6' and 7" are dimensioned in their mutual positions so that their distance from each other is slightly smaller than the diameter of the balls. The balls are thus held securely in the drill chuck.

FIGS. 5 to 11 show a modified embodiment of the invention, wherein a hammer drill holder employs balls to radially engage lateral grooves of the shaft of the hammer drilling tool, but the switching from its use for drilling or for hammer drilling is effected in a different manner.

Figure 5:
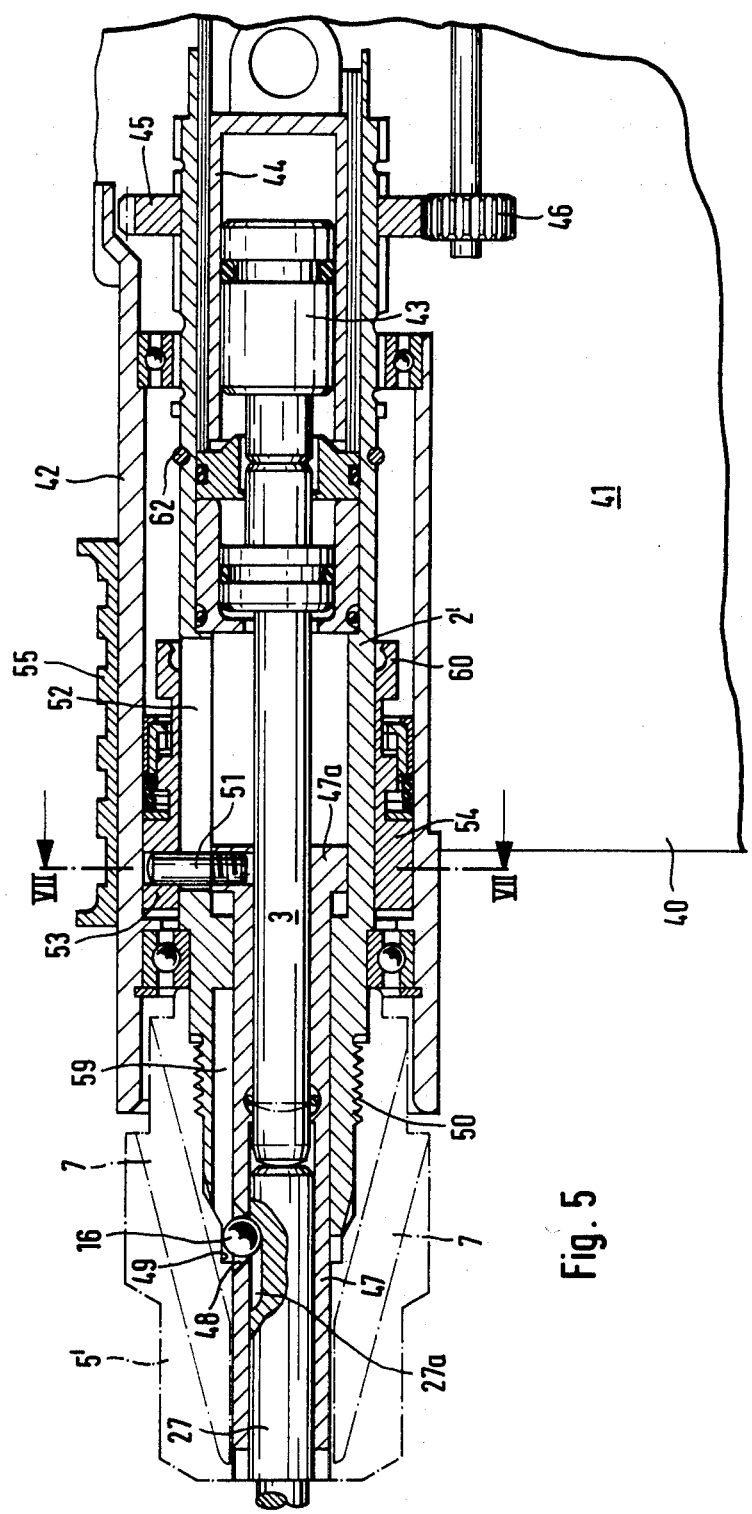
FIG. 5 depicts a modified embodiment of the end of the drilling head of a manual drilling machine according to the invention, wherein an axially displaceable indexing sleeve enters the drill chuck in the "hammer drilling" position.

In the form of embodiment of FIG. 5, the new modified manual drilling machine is shown in the "hammer drilling" position. This manual drilling machine is mounted within a drilling machine housing 40, which as schematically indicated, forms a handle 41 and contains inside an electric drive motor (not shown). A bearing tube 42 of the machine is provided to bearingly support the rotating drive spindle 2', which is hollow and carries the impact bolt 3 therewithin. This impact bolt 3 is exposed, in a manner known in itself, to the axial impacts of a piston 43. The piston is located in a back-and-forth reciprocating fluid actuated cylinder 44 (not shown) which moves the bolt 3 by compression of air inside the cylinder. The hollow drive spindle 2' is rotated by means of a toothed wheel 45 mounted thereupon and driven by a pinion 46, which in turn, is driven by a motor (not shown). An indexing sleeve 47 moves within the drive spindle 2', and serves over at least part of its length, to guide the impact bolt 3. The indexing sleeve 47 is equipped at its front end with holding means for a hammer drilling tool 27, which, as in the example of embodiment of FIGS. 1 to 4, comprises at least one, preferably two, balls 16, which here are guided in a lateral recess 48 of the indexing sleeve 47. In the "hammer drilling" position the ball engages the groove 27a of the hammer drilling tool 27. To insure that the ball 16 remains in this position, it is held by approximately cylindrical inner surface 49 of the drill chuck 5'. Blockage against movement in the axial direction is provided by the indexing sleeve 47. In the embodiment of FIGS. 5 to 11, the drill chuck 5' is equipped with a passage orifice to the rear and therefore has a sleeve-like configuration and is screwed onto an outside thread 50 of the drive spindle 2'. The jaws 7 are merely indicated schematically in FIG. 5. The adjusting mechanism for the jaws 7, which is not shown, may be of a conventional form. The indexing sleeve 47 has at its end located inside the drive spindle 2' a collar 47a, into which a radially outward projecting pin 51 is screwed rigidly. The pin 51 passes through an elongated slot 52 in the drive spindle 2' and engages, as seen particularly in FIG. 7, an elongated hole 53 of a locking sleeve 54, the configuration and operation whereof will be further described hereinafter.

Figure 6:
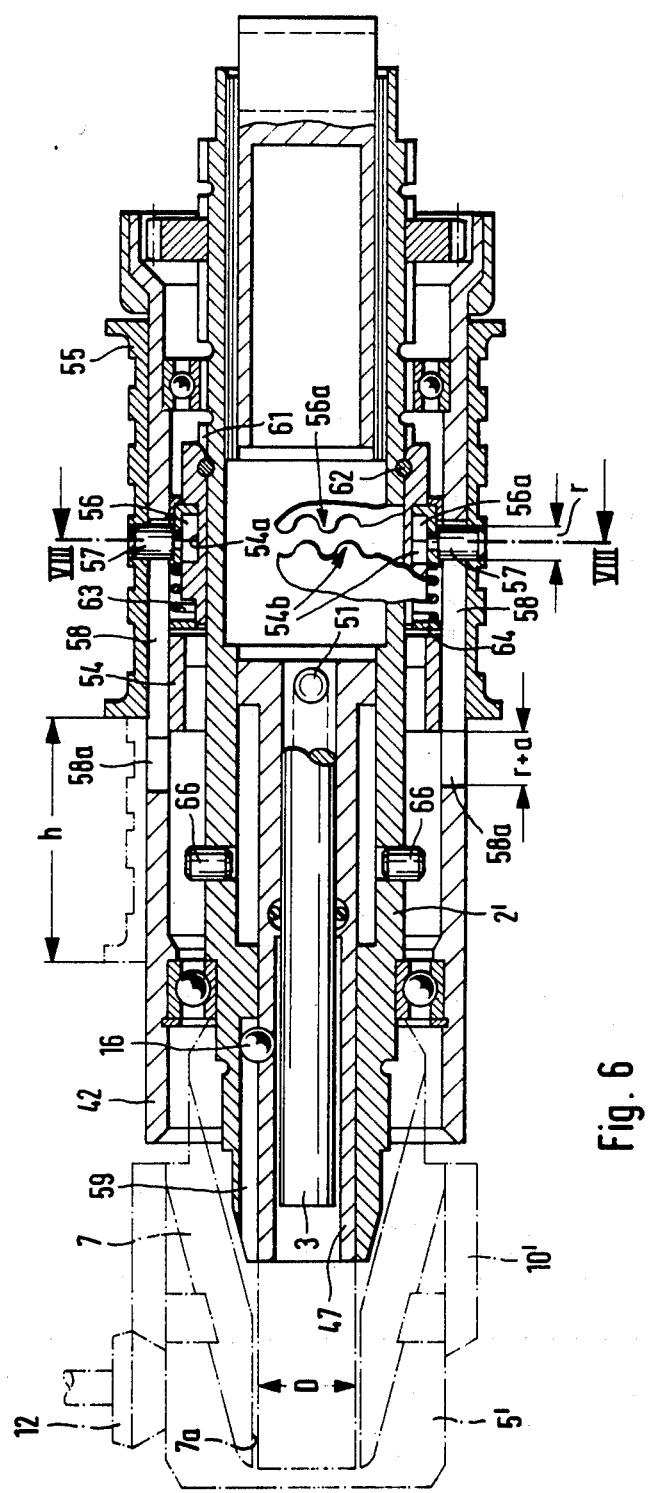
FIG. 6 depicts the embodiment of FIG. 5, but in the drilling position, with the indexing sleeve retracted.

The locking sleeve 54 is, in turn, connected (as seen in FIG. 6), by means of a clutch, with a handle 55, the latter being mounted on the outside of the guide tube 42 and surrounding the tube 42 over an area of at least 180 degrees, as shown in FIG. 8. The handle 55 is fixedly connected with a driver ring 56 by means of two diametrically opposed pins 57, which in turn, pass outwardly through elongated slots 58 in the guide tube 42. The driver ring 56 is located in a groove 54a of the drive sleeve 54, so that by means of an axial motion of the handle 55 to the right from the FIG. 5 position through the stroke h (FIG. 6), the indexing sleeve 47 may be brought from the position shown in FIG. 5 into the position in FIG. 6. This FIG. 6 position corresponds to the "drilling" position of the manual drilling machine. It may be seen that in this position of the indexing sleeve 47, the jaws 7 are radially free and may be adjusted by the actuation of the adjusting wrench 12 in the radially inward direction, as in the FIG. 1 embodiment. As is apparent from FIG. 6, the jaws 7 are able to accept drilling tools up to the diameter D, which is not true for the configuration of FIG. 1, wherein the maximum opening between the clamping surfaces 7a corresponds to the shaft diameter for a hammer drill. In the FIGS. 5-6 embodiment, therefore, the diameter of the drilling tools to be mounted is increased by the entire wall thickness of the indexing sleeve 47, which inside is laid-out to receive the hammer drilling tools.

It further is seen in FIG. 6 that in the retracted position of the indexing sleeve 47, the ball 16 has been pressured from its FIG. 5 position in the radially outward direction, so that it impacts the end of the impact bolt 3 and is pressured into a longitudinal groove 59, open to the front, provided for this purpose in the drive spindle 2'. The ball 16, therefore, in the FIG. 6 position is out of action. As the end of the impact bolt 3 does not extend into the area of the clamping surface 7a of the jaws 7, in this position of the manual drilling machine, the drill chuck 5' may be actuated and used in the known manner. The manual drilling machine is suitable and designed for drilling only. The drill chuck 5' is connected fixedly in rotation with the rotating drive. The axial motion of the drilling tool is blocked.

In the embodiment of FIGS. 5 to 11, the purpose is to lock the indexing sleeve 47 in the two terminal positions "drilling" (FIG. 6) and "hammer drilling" (FIG. 5). Thus, the locking sleeve 54 is laid out and arranged in a special manner. The sleeve 54 is connected, as has become apparent from the description hereinabove, by means of the pin 51 axially with the indexing sleeve 47. The sleeve 54 is also connected rotatingly with the drive spindle 2' in that the pin 51 passes through drive spindle 2'. The sleeve 54 may be actuated by the handle 55, which is located outside the housing and is not to take part in the rotation, only by means of the aforementioned clutch, which renders possible the disengagement of the rotating motion to the outside.

The locking sleeve 54 in the terminal position of "drilling" shown in FIG. 6, is secured, in that resiliently elastic arms 60 (see FIG. 5) are provided which are equipped with an internal, circumferential groove 61. In the FIG. 6 position of the indexing sleeve 47 (and the locking sleeve 54 axially connected with it) the arms 60 overlie a ring 62, rigidly set onto the outer circumference of the drive spindle 2'. The terminal position of the indexing sleeve 47 is thereby secured. This terminal position is obtained by displacing the handle 55 from the FIG. 5 position to the right into the FIG. 6 position, whereby the driver ring 56 abuts against the wall of the groove 54a and consequently displaces the locking sleeve to the right until the elastic arms 61 of the latter grip the ring 62. When it is intended to switch from the FIG. 6 position to the "hammer drilling" position of FIG. 5, the handle 55 is displaced from the FIG. 6 position by the stroke length h toward the left. The driver ring 56, which is rigidly connected by means of the pins 57 with the handle 55, is thereby released from the right-hand wall of the groove 54a and engages its teeth 56a (provided in its side facing to the left in FIG. 6) with the corresponding teeth 54b of the locking sleeve 54 and is now able to displace the locking sleeve 54 toward the left. In the course of this movement, the driver ring 56 is moved against the force of a return spring 63, resting against a disk 64, which in turn, is supported against a stop of the locking sleeve 54.

In order to then immobilize the locking sleeve 54 in the left-hand terminal position (FIG. 5), a plurality of recesses 65 are provided on the inside of the locking sleeve 54, as seen particularly in FIG. 10, to form a bayonet lock, the recesses defining a type of insertion orifice for the pins 66, which are set rigidly into the drive spindle 2'. The pins 66 thus are inserted during the displacement of the locking sleeve 54 into the funnel like opening of the bayonet lock recess 65 and are able to lock positively into the locking range 65a by means of a rotation by the angle Δ (FIG. 11), particularly as the indexing sleeve 47 is exposed to the force of a return spring (not shown), which acts in the direction of the drill chuck 5' on the sleeve. In order to make this slight rotating motion by the angle α possible, the pin 51 connecting the indexing sleeve 47 with the locking sleeve 54 is arranged in an elongated hole 53 extending in the circumferential direction over an angle of α. The diametrically opposed elongated hole 53' is provided only to simplify mounting and may be used similarly, depending on the position of the sleeve for the insertion of the pin 51. In order to make possible the rotation by the angle of α from the outside for the purpose of locking the pins 66, it is further necessary to widen the longitudinal slot 58, in which the driver pin 57 is guided, at least at its left end (FIG. 6) by an amount in the circumferential direction the angular deflection by the angle α from the contact 55 may be transferred to the locking sleeve 54. So that subsequently the driver ring 56 and the handle 55 are disengaged from the teeth 54b, i.e., so that the teeth 56a of the driver ring 56 may again be moved out, the length of the widening 58a, indicated in FIG. 6, must correspond at least to the diameter r of the driver ring 57 plus the height a (FIG. 10) of the teeth 54b. The driver ring is released in such a configuration automatically by the return force of the spring 63 from the teeth 54b, when the handle 55 is released. Utilization for "hammer drilling" (FIG. 5) is then possible. Reverse switching is effected in the inverse order. The handle is initially pushed back until the two set of teeth 54b and 56a are engaging each other. It is then possible to rotate the locking sleeve 54 out from its bayonet lock and the sleeve may then be returned into the position of FIG. 6.

Although the present invention has been described in connection with preferred embodiments thereof, it will be appreciated by those skilled in the art that additions, modifications, substitutions, and deletions, not specifically described, may be made without departing from the spirit and scope of the invention as defined in the appended claims.

What is claimed is:

1. In a drilling mechanism of the type comprising a hollow drive spindle, means for rotating said spindle, an impact bolt longitudinally movable within said spindle, a tool chuck mounted at a front end of said spindle and adapted to carry a tool, and means for driving said tool selectively in one of a rotary drilling mode and a rotary hammer drilling mode comprising:
 a first tool holder including a plurality of tool-clamping jaws disposed in said chuck and operably connected to said spindle to be rotated thereby,
 first manually actuable means operably connected to said jaws for moving said jaws between
  a tool-clamping position in which forward ends of said jaws converge to grip a rotary drilling tool for preventing axial movement thereof and transmitting rotary forces thereto from said spindle, and
  a tool-release position in which said jaw ends diverge to form a space therebetween to release said rotary drilling tool,
 a second tool holder arranged to retain a rotary hammer drilling tool in said chuck when said jaws are in said tool-release position, said second tool holder including retaining means for retaining the hammer drilling tool in position to be impacted and moved axially by said impact bolt and to be rotationally driven by said spindle,
 second manually actuable means operably connected to said second tool holder for moving said retaining means into a tool retaining position, and
 one of said first and second tool holders, when arranged in a tool-retaining position, being disposed to block movement of the other of said tool holders to a tool-retaining position.

2. Drilling mechanism according to claim 1, wherein said second holder comprises a sleeve, and said retaining means includes at least one radially movable ball carried by said sleeve, an inclined stop surface disposed in said chuck, said sleeve being axially movable in a first direction to bring said ball into contact with said stop surface to displace said ball into engagement with an axial groove of the hammer drill tool, and spring means for biasing said sleeve in said first direction.

3. Drilling mechanism according to claim 2, characterized in that said jaws are arranged to retain said at least one ball in a radially outward position when said jaws are in said tool-clamping position, and to permit said at least one ball to move to a radially inward position when said jaws are in said tool-release position.

4. Drilling mechanism according to claim 3, characterized in that said jaws include first holding projections arranged at forwardmost ends of said jaws, said drill chuck including second holding projections arranged to cooperate with said first holding projections to prevent said at least one ball from dropping out of said holder.

5. Drilling mechanism according to claim 2, wherein said second manually actuable means comprises a rotatable outer cap surrounding said sleeve, said cap including a plurality of internal projections which are displaceable axially in response to rotation of said cap, said sleeve including a plurality of outwardly directed external projections which are engageable with said internal projections, such that said internal projections define first and second axial positions of said sleeve for use in rotary drilling and rotary drilling modes, respectively.

6. Drilling mechanism according to claim 2, wherein said first manually actuable means comprises a rotatable adjusting ring operably connected to said jaws, said cap including circumferential recess means therein which aligns with said adjusting ring to permit a key to be inserted into engagement with said adjusting ring.

7. Drilling mechanism according to claim 1, characterized in that said second holder comprises an axially displaceable indexing sleeve mounted on said spindle and protruding into said drill chuck, said indexing sleeve being arranged to be locked in two terminal positions associated respectively with rotary drilling and rotary hammer drilling and means for guiding said hammer drilling tool for axial movement.

8. Drilling mechanism according to claim 1, wherein said jaw ends include clamping surfaces which clampingly engage the rotary drilling tool when in said tool-clamping position, and which define guiding surfaces for axially slidably guiding the rotary hammer drilling tool when in said tool-release position.

9. Drilling mechanism according to claim 1, characterized in that said second holder comprises an axially displaceable indexing sleeve mounted on said spindle and protruding into said drill chuck, said indexing sleeve being arranged to be locked in two terminal positions associated respectively with rotary drilling and rotary hammer drilling and means for guiding said hammer drilling tool for axial movement.

10. Drilling mechanism according to claim 9, characterized in that said drill chuck is screwed onto the outside of the hollow drive spindle, said indexing sleeve being guided inside the drive spindle and being arranged to guide said impact bolt.

11. Drilling mechanism according to claim 9, characterized in that said indexing sleeve has an axial stroke length such that in its terminal position associated with rotary drilling its front end is located behind the jaws, while in the terminal position for rotary hammer drilling it extends between the ends of the jaws and is guided thereby in the radial direction.

12. Drilling mechanism according to claim 9, characterized in that the terminal positions of the indexing sleeve are defined by said second manually actuable means, a locking sleeve located upon the outside of said drive spindle, said locking sleeve being connected with said indexing sleeve for axial movement therewith and being displaceable from the outside into two terminal positions, wherein it may be locked.

13. Drilling mechanism according to claim 12, characterized in that said locking sleeve is connected with said indexing sleeve by means of a radial pin which passes through an elongated slot in the drive spindle and further by means of a releasable clutch having said clutch located outside of a housing portion of the spindle.

14. Drilling mechanism according to claim 13, characterized in that said locking sleeve includes bayonet locking recesses, said drive spindle including corresponding bayonet locking projections insertable in said bayonet locking recesses to secure said locking sleeve in the rotary hammer drilling position, said pin being movably arranged in a circumferentially elongate hole in said locking sleeve, with the circumferential length of said hole corresponding at least to the length of said bayonet locking recesses.

15. Drilling mechanism according to claim 14, characterized in that said bayonet locking projections comprise pins set into said drive spindle.

16. Drilling mechanism according to claim 14, characterized in that said locking sleeve includes an end facing away from said bayonet locking recesses, elastic locking arms being mounted on said end, said spring arms engaging a bead on said drive spindle to secure the indexing sleeve in the rotary drilling position.

17. Drilling mechanism according to claim 13, characterized in that said clutch comprises a driver ring arranged in a rotating and axially displaceable manner on said locking sleeve and rigidly connected with a manually movable handle, said driver ring being engageable with stops on said locking sleeve.

18. Drilling mechanism according to claim 17, characterized in that one of said stops faces said bayonet locking recesses and is in the form of a stop collar equipped with axial projections, said driver ring being equipped with corresponding projections which cooperate positively with the projections of the locking sleeve and make possible a rotation sufficient for bayonet locking of the locking sleeve in the terminal position for rotary hammer drilling.

19. Drilling mechanism according to claim 17, characterized in that said driver ring is arranged to be pushed in the direction of said axial projections of the stop collar against a spring bias.

20. Drilling mechanism according to claim 17, characterized in that said driver ring is connected to said handle by means of two diametrically opposed pins, said handle mounted on the outside of said housing portion of said spindle and extending for at least 180 degrees, said pins being guided in longitudinal slots in said housing, said longitudinal slots having ends facing said drill chuck, which ends being widened in the circumferential direction corresponding to the path of rotation necessary for bayonet locking.

21. Drilling mechanism according to claim 20, characterized in that the widening of said longitudinal slots has an axial dimension corresponding at least to the diameter of said pins connecting said driver ring with said handle plus the height of said teeth on said stop collar.

22. Drilling mechanism according to claim 9, characterized in that said retaining means comprises balls guided movably in the axial direction in recesses of said indexing sleeve and disposed partially in longitudinal grooves of said drive spindle when said indexing sleeve is in the rotary drilling position of said mechanism and partially into corresponding recesses of the hammer drilling tool when said indexing sleeve is in the hammer drilling position and in this position are held in place by parts of said drill chuck located adjacent to the indexing sleeve.

23. Drilling mechanism according to claim 22, characterized in that said longitudinal grooves in said drive spindle are open toward said drill chuck, in front of each longitudinal groove inner sides of the jaws are positioned which extend obliquely to the axis of said drive spindle.

24. In a drilling mechanism of the type comprising a hollow drive spindle, means for rotating said spindle, an impact bolt longitudinally movable within said spindle, a tool chuck mounted at a front end of said spindle and adapted to carry a tool, and means for driving said tool selectively in one of a rotary drilling mode and a rotary hammer drilling mode comprising:
- a first tool holder including a plurality of tool-clamping jaws disposed in said chuck and operably connected to said spindle to be rotated thereby,
- first manually actuable means operably connected to said jaws for moving said jaws between
  - a tool-clamping position in which forward ends of said jaws converge to grip a rotary drilling tool for preventing axial movement thereof and transmitting rotary forces thereto from said spindle, and
  - a tool-release position in which said jaw ends diverge to form a space therebetween to release said rotary drilling tool,
- a second tool holder arranged to retain a rotary hammer drilling tool in said chuck when said jaws are in said tool-release position, said second tool holder including retaining means for retaining the hammer drilling tool in position to be impacted and moved axially by said impact bolt and to be rotationally driven by said spindle, and
- second manually actuable means operably connected to said second tool holder for moving said retaining means into a tool retaining position,
- said second holder comprising an axially displaceable indexing sleeve mounted on said spindle and protruding into said drill chuck, said indexing sleeve being arranged to be locked in two terminal positions associated respectively with rotary drilling and rotary hammer drilling and means for guiding said hammer drilling tool for axial movement, said indexing sleeve having an axial stroke length such that in its terminal position associated with rotary drilling its front end is located behind the jaws, while in the terminal position for rotary hammer drilling it extends between the ends of the jaws and is guided thereby in the radial direction.

25. In a drilling mechanism of the type comprising a hollow drive spindle, means for rotating said spindle, an impact bolt longitudinally movable within said spindle, a tool chuck mounted at a front end of said spindle and adapted to carry a tool, and means for driving said tool selectively in one of a rotary drilling mode and a rotary hammer drilling mode comprising:
- a first tool holder including a plurality of tool-clamping jaws disposed in said chuck and operably connected to said spindle to be rotated thereby,
- first manually actuable means operably connected to said jaws for moving said jaws between
  - a tool-clamping position in which forward ends of said jaws converge to grip a rotary drilling tool for preventing axial movement thereof and transmitting rotary forces thereto from said spindle, and
  - a tool-release position in which said jaw ends diverge to form a space therebetween to release said rotary drilling tool,
- a second tool holder arranged to retain a rotary hammer drilling tool in said chuck when said jaws are in said tool-release position, said second tool holder including retaining means for retaining the hammer drilling tool in position to be impacted and moved axially by said impact bolt and to be rotationally driven by said spindle, and
- second manually actuable means operably connected to said second tool holder for moving said retaining means into a tool retaining position,
- said second holder comprising an axially displaceable indexing sleeve mounted on said spindle and protruding into said drill chuck, said indexing sleeve being arranged to be locked in two terminal positions associated respectively with rotary drilling and rotary hammer drilling and means for guiding said hammer drilling tool for axial movement,
- said retaining means comprising balls guided movably in the axial direction in recesses of said indexing sleeve and disposed partially in longitudinal grooves of said drive spindle when said indexing sleeve is in the rotary drilling position of said mechanism and partially into corresponding recesses of the hammer drilling tool when said indexing sleeve is in the hammer drilling position and in this position are held in place by parts of said drill chuck located adjacent to the indexing sleeve, said longitudinal grooves in said drive spindle being open toward said drill chuck, in front of each longitudinal groove inner sides of the jaws are positioned which extend obliquely to the axis of said drive spindle.

* * * * *